US012269194B2

(12) United States Patent
Twigg et al.

(10) Patent No.: US 12,269,194 B2
(45) Date of Patent: Apr. 8, 2025

(54) RUBBER FORMULATION

(71) Applicant: Atlantis Rubber Powders B.V., Sittard (NL)

(72) Inventors: Christopher Michael Twigg, Nederweert (NL); Wim Migchels, Nederweert (NL); Jeroen Claessens, Nederweert (NL); Robert Jan Zootjes, Nederweert (NL); Jan Gijsbertus Driessen, Nederweert (NL)

(73) Assignee: Atlantis Rubber Powders B.V., Sitttard (NL)

( * ) Notice: Subject to any disclaimer, the term of this patent is extended or adjusted under 35 U.S.C. 154(b) by 221 days.

(21) Appl. No.: 17/797,525

(22) PCT Filed: Feb. 18, 2021

(86) PCT No.: PCT/NL2021/050110
§ 371 (c)(1),
(2) Date: Aug. 4, 2022

(87) PCT Pub. No.: WO2021/167457
PCT Pub. Date: Aug. 26, 2021

(65) Prior Publication Data
US 2023/0083416 A1 Mar. 16, 2023

(30) Foreign Application Priority Data
Feb. 18, 2020 (NL) ..................... 2024936

(51) Int. Cl.
| B29B 17/04 | (2006.01) |
| B02C 18/14 | (2006.01) |
| B02C 19/18 | (2006.01) |
| B29B 17/02 | (2006.01) |
| C08F 36/08 | (2006.01) |
| C08J 3/12 | (2006.01) |
| C08J 3/22 | (2006.01) |
| C08K 3/36 | (2006.01) |
| C08K 9/06 | (2006.01) |
| B29K 105/00 | (2006.01) |
| B29L 30/00 | (2006.01) |

(52) U.S. Cl.
CPC ........ *B29B 17/0408* (2013.01); *B02C 18/148* (2013.01); *B02C 19/186* (2013.01); *B29B 17/02* (2013.01); *B29B 17/0412* (2013.01); *C08F 36/08* (2013.01); *C08J 3/124* (2013.01); *C08J 3/226* (2013.01); *C08K 3/36* (2013.01); *C08K 9/06* (2013.01); *B29B 2017/0203* (2013.01); *B29B 2017/0224* (2013.01); *B29B 2017/0416* (2013.01); *B29B 2017/042* (2013.01); *B29K 2105/251* (2013.01); *B29L 2030/00* (2013.01); *C08J 2307/02* (2013.01); *C08K 2201/006* (2013.01); *Y02W 30/62* (2015.05); *Y10S 241/31* (2013.01); *Y10S 241/37* (2013.01)

(58) Field of Classification Search
None
See application file for complete search history.

(56) References Cited

U.S. PATENT DOCUMENTS

| 3,622,650 | A | * | 11/1971 | Berstein | .................. C08K 3/36 |
| | | | | | 241/5 |
| 6,265,454 | B1 | | 7/2001 | McNutt et al. | |
| 2005/0107484 | A1 | | 5/2005 | Cialone | |
| 2007/0155861 | A1 | | 7/2007 | Chen et al. | |
| 2014/0128535 | A1 | | 5/2014 | Rosenmayer et al. | |
| 2016/0152805 | A1 | | 6/2016 | Jasiunas et al. | |
| 2016/0208082 | A1 | * | 7/2016 | Jasiunas | ................. C08L 21/00 |
| 2016/0297243 | A1 | | 10/2016 | Denstaedt | |
| 2017/0043351 | A1 | * | 2/2017 | Stravinski | ............... B02C 23/10 |

FOREIGN PATENT DOCUMENTS

| EP | 3045492 A1 | 7/2016 |
| EP | 3470197 A1 | 4/2019 |
| JP | 2004182777 A | * | 7/2004 |

OTHER PUBLICATIONS

International Search Report (ISR) for PCT/NL2021/050110 mailed May 26, 2021 (4 pages).
Written Opinion for PCT/NL2021/050110 mailed May 26, 2021 (5 pages).
A.K. Naskar et al. "Characterization of Ground Rubber Tire and Its Effect on Natural Rubber Compound", Rubber Chemistry and Technology, American Chemical Society, Rubber Division, US, vol. 73, No. 5, p. 902-911, Nov. 1, 2000.

* cited by examiner

*Primary Examiner* — Jared O Brown
(74) *Attorney, Agent, or Firm* — Shumaker, Loop & Kendrick, LLP

(57) ABSTRACT

A method for manufacturing micronized rubber powders including grinding of a rubber granulated feedstock, size classification and storage of the micronized rubber powders thus obtained. A rubber formulation including at least one natural or synthetic rubber, a micronized rubber composition and optionally one or more of processing aids, antidegradants, fillers, accelerators and curatives. A method for manufacturing a rubber product, as well as to a solid rubber product.

15 Claims, No Drawings

RUBBER FORMULATION

TECHNICAL FIELD AND BACKGROUND

The present invention relates to a method for manufacturing micronized rubber powders comprising grinding of a rubber granulated feedstock, size classification and storage of the micronized rubber powders thus obtained. The present invention also relates to a rubber formulation comprising at least one natural or synthetic rubber, a micronized rubber composition and optionally one or more of processing aids, antidegradants, fillers, accelerators and curatives. The present invention also relates to a method for manufacturing a rubber product, as well as to a solid rubber product.

Micronized rubber powder (MRP) is a low-cost, sustainable raw material that replaces oil- and rubber-based materials. MRP is a free flowing, black rubber powder that disperses into a multitude of systems and applications. Due to its micron size, MRP can be incorporated into multiple polymers, and provides a smooth surface appearance on finished products. In some cases, in order to improve compatibility and performance with host materials, the MRP is given a chemical treatment to activate, or "make functional" the surface of the powder particles. This is referred to as functionalized MRP or FMRP. Non-functionalized MRP only finds applications as a cheap filler. Micronized rubber powders (MRP) typically contain a significant fraction of rubber particles having a particle size of less than 100 microns. Powders having a particle size which is within the range of 40-300 mesh are generally considered to be micronized rubber powder.

MRP represents an evolution over previous post-manufactured rubber technologies. The most basic rubber processing technology converts end-of-life tire and post-industrial rubber material into rubber chips that are typically one inch or larger in size. These chips are then used in tire-derived fuel and civil engineering projects. MRP is a micron-size material that is produced in various sizes, including 80 mesh and down to 300 mesh. Only FMRP finds its way into high end applications, such as high-performance tires, industrial rubber, consumer and industrial plastics goods, asphalt and coatings and construction materials. MRP is used as a compound extender to offset the use of natural rubber and synthetic polymers as well as act as a process aid in material production.

Rubber formulations comprising micronized rubber powder are known in the art.

US 2016/297243 relates to a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein the sidewalls are comprised of 20 phr to 80 phr of natural rubber, 20 phr to 80 phr of polybutadiene rubber, and 3% over batch weight to 20% over batch weight of micronized rubber powder, based upon the total sidewall formulation, wherein the micronized rubber powder has a particle size which is within the range of 40 Mesh to 300 Mesh.

US 2016/152805 relates to a rubber composition which is comprised of a solution styrene-butadiene rubber; a functionalized renewed rubber composition which is comprised of an elastomeric polymer and a stabilizer, and a reinforcing filler including reinforcing silica.

EP 3 045 492 relates to a rubber formulation which is useful in rubber products or components of rubber products which are subject to abrasive forces, said rubber formulation comprises at least one natural or synthetic rubber and from 1 weight percent to 30 weight percent of a micronized rubber composition having a particle size which is within the range of 40 mesh to 200 mesh, wherein the micronized rubber composition is comprised of at least 10 weight percent solution styrene-butadiene rubber.

US 2014/128535 relates to a method of functionalizing reclaimed elastomer material, the reclaimed elastomer material including an elastomer having intra-chain and inter-chain bonds, the method comprising subjecting particles of the reclaimed elastomer material to shear at temperatures less than 100° C. such that inter-chain bonds of the reclaimed elastomer material are cleaved, wherein the particles of the reclaimed elastomer material have a size of 40 mesh or smaller.

U.S. Pat. No. 6,265,454 relates to a method for recycling cured tire rubber, comprising the steps of: blending recycled cured ground tire rubber particles with a tire component rubber formulation, the formulation comprising the rubber and additives, and the recycled cured ground tire rubber particles having a size of 90 U.S. Standard Mesh or smaller, wherein the amount of the recycled cured ground tire rubber particles is from about 2 to about 50 parts by weight based upon 100 total parts by weight of the tire component rubber formulation and the recycled cured ground tire rubber particles, and wherein the recycled cured ground tire rubber particles replace a partial amount of the tire component rubber formulation.

EP 3 470 197 relates to a method of cryogenically grinding particles, comprising the steps of: grinding chilled granulated particles to form a micronized powder having a broad particle size distribution; warming the micronized powder; accumulating the warmed micronized powder within an accumulating apparatus; and screening the accumulated, warmed micronized powder into one or more predetermined portions, wherein each of the one or more predetermined portions comprise a predetermined range of particle sizes of the screened, warmed micronized powder, wherein the broad particle size distribution includes particles having a size greater than or equal to 50 mesh and also less than or equal to 140 mesh.

US 2005/107484 relates to a process of making crumb and powder rubber comprising: chilling a preprocessed stream of used rubber particles having a predetermined particle size range with a cryogenic fluid wherein the final chilled temperature of the particles is controlled, grinding the stream of chilled rubber particles wherein the particle size distribution of the ground rubber particles is controlled; and screening the ground particle stream into desired crumb and/or powder rubber particle size ranges, wherein the particles from which excess sized particles are removed is screened into three rubber particle sizes including a first particle size range of particles passing through U.S. sieve size No. 40 but not passing through U.S. sieve size No. 80; a second particle size in the range of between particles passing through U.S. sieve size No. 80 but not passing through U.S. sieve size No. 140; and a third particle size of particles passing through U.S. sieve size No. 140.

US 2017/043351 relates to a method of warming cryogenically-ground micronized particles after grinding, comprising the steps of: feeding the micronized particles to a warming apparatus; determining an operating efficiency of the warming apparatus; determining whether the operating efficiency of the warming apparatus is below a predefined threshold; and upon determination that the operating efficiency of the warming apparatus is below a predefined threshold, recirculating the micronized particles through the warming apparatus.

SUMMARY

The present inventors are of the opinion that the greatest future role that Micronized Rubber Powders (MRP) can have towards CO2 reduction and fulfilling cradle-to-cradle/circular economy principles is to re-use them in tyres. Approximately 30 million tons of new tyres are manufactured annually and currently around half of this volume of tyres are collected and enter the end-of-life (EOL) tyre management waste streams every year. To date there is still no significant re-use of waste tyres back into new tyres, resulting in a pressing global problem in how to deal with EOL tires in an environmentally friendly way and to maximize the value and volumes of EOL tyre-derived circular materials.

DETAILED DESCRIPTION

Three main technologies focusses on circular EOL tyre objectives; namely pyrolysis (recovered carbon black/oil/gas), devulcanisation and MRP. Global initiatives have been ongoing for many decades and continue today at an accelerated pace due to the global warming crisis and the negative impacts that tyre production has on the environment. Each of the three technologies presents its own set of challenges that need to be overcome before large scale re-use in new tyres will be possible.

Specifically regarding MRP the main limiting factors restricting large-scale re-use in tyres are twofold:

1. Size reduction is limited due to energy efficiencies and certain technological limitations to about 180 microns (D95 percentile)
2. Low surface energy (powders do not effectively co-vulcanize into the new tyre compounds because there are no active chemical groups on the surface of the powder to create chemical crosslinks/covalent bonds)

The net effect of these limiting factors is that the addition of small percentages (~2-6 wt. %) of MRPs into new tyre compounds yields unacceptably low mechanical reinforcement (particularly with regards to tear strength and abrasion resistance). Additionally the dynamic performance of compounds containing MRP is compromised, manifesting in an increased tan delta value and Payne effect, leading to an increase in hysteresis, heat build-up and rolling resistance of the tire. This reduces the fuel efficiency of a tyre.

An object of the present invention is to develop a method for chemically activating/functionalizing MRP.

Another object of the present invention is to develop a method for manufacturing micronized rubber powders.

Another object of the present invention is to develop a method and engineer an industrial process for upscaling to large volumes of functionalized MRP (~8-10 ktons/year).

Another object of the present invention is to develop a method for converting functionalized MRP into a solid strip or slab whilst retaining performance and dispersibility.

The present invention thus relates to a method for manufacturing micronized rubber powders comprising grinding of a rubber granulated feedstock, size classification and storage of the micronized rubber powders thus obtained, wherein during the grinding process an agent is used to prevent the rubber powder particles sticking to themselves, wherein the agent is chosen from the group of synthetic amorphous precipitated silica and silane-treated synthetic amorphous precipitated silica, or a combination thereof.

The present inventors found that by incorporating such an agent into a method for manufacturing micronized rubber powders one or more objects are achieved. The present inventors found that reactivation of the vulcanization potential of the MRP by chemical treatment can significantly improve both the mechanical and dynamic performance of MRPs in rubber compounds, thereby opening the door to large scale re-use within the tyre and TRG sectors. Such a contact step can be seen as "first stage activation".

In an embodiment of the method for manufacturing micronized rubber powders the total amount of the agent is a range of 0.1-4.0 wt. %, preferably of 0.3-1.5 wt. %, based on the total weight of the micronized rubber powders.

In an embodiment of the method for manufacturing micronized rubber powders the agent is in a fluffy state and the BET surface area of the agent is between 50 and 250 $m^2/g$, preferably between 140 and 190 $m^2/g$.

In an embodiment of the method for manufacturing micronized rubber powders the agent is silane-treated synthetic amorphous precipitated silica.

In an embodiment of the method for manufacturing micronized rubber powders the grinding process of the rubber granulated feedstock comprises a two-step grinding process, namely a) ambient grinding followed by b) cryogenic grinding, wherein especially step b) is carried out in a range of −40 to −80° C. for a rubber granulated feedstock comprising natural rubber and in a range of −20 to −60° C. for a rubber granulated feedstock comprising natural rubber and styrene-butadiene rubber.

In an embodiment of the method for manufacturing micronized rubber powders the particle size of the rubber granulated feedstock before the grinding process is 2-5 mm.

In an embodiment of the method for manufacturing micronized rubber powders the particle size of the rubber granulated feedstock after a) ambient grinding is 0.1-0.8 mm.

The rubber granulated feedstock is chosen from the group of natural rubber, synthetic polyisoprene rubber, high cis-1, 4-polybutadiene rubber, medium vinyl polybutadiene rubber, high vinyl polybutadiene rubber, emulsion styrene-butadiene rubber, solution styrene-butadiene rubber, styrene-isoprene-butadiene rubber, styrene-isoprene rubber, butyl rubber, chlorobutyl rubber, bromobutyl rubber, polynorbornene rubber, ethylene-propylene rubber (EPR), ethylene-propylene-diene rubber (EPDM), nitrile rubber, carboxylated nitrile rubber, polychloroprene rubber (neoprene rubber), polysulfide rubbers, polyacrylic rubbers, silicone rubbers, chlorosulfonated polyethylene rubbers, and various mixtures thereof.

In an embodiment of the method for manufacturing micronized rubber powders the step of size classification provides at least two micronized rubber powders product streams, comprising an 80 mesh stream and an 40 mesh stream.

In an embodiment of the method for manufacturing micronized rubber powders at least one of the 80 mesh micronized rubber powders product stream and the 40 mesh micronized rubber powders product stream is contacted with an agent chosen from the group of synthetic amorphous precipitated silica, silane-treated synthetic amorphous precipitated silica, organosilane and organic peroxide, or a combination thereof for obtaining an activated micronized rubber powder product, preferably an organosilane polysulphide type or disulfide type. Such a contact step can be seen as "second stage activation".

The present invention also relates to a rubber formulation comprising at least one natural or synthetic rubber, a micronized rubber powder obtained as discussed above and optionally one or more of processing aids, antidegradants, fillers, accelerators and curatives, wherein the rubber formulation comprises at least one activation component chosen from the group silane, NR latex, organic peroxides, polyoctenamer, curatives, polyethylene wax, emulsion styrene butadiene rubber (eSBR), liquid acrylonitrile butadiene rubber (NBR), zinc oxide and colloidal sulphur.

The principle of "surface activation" is to form chemical crosslinks between the vulcanized MRP and unvulcanised rubber compound during vulcanization of the new rubber product. The powders no longer exist as "discrete and disruptive" particles in the new compound matrix, instead they become an integral (bonded) part of a much more homogenous matrix. The surface activation can be achieved, for example, by coating the surface of the powder with a crosslinkable (unsaturated) polymer together with certain vulcanization chemicals such as zinc oxide, stearic acid, sulphur and organic accelerators. The surface treatment can be applied, for example, by a continuous extrusion or continuous powder drying process. An extrusion or milling process would convert the powder into a solid strip or slab. Such a process would have the advantage of converting a low bulk density powder to an extruded solid form (e.g. strip, sheet) where the powder particles become bound together by the new polymer(s) and other process additives. Furthermore, conversion of low bulk density powder to a solid material will almost triple the bulk density of the powder (from ~400 kg/m$^3$ to ~1150 kg/m$^3$) thereby facilitating efficient transportation and avoiding expensive powder bagging costs.

In an embodiment of a rubber formulation the amount of the activation component(s) in the rubber formulation is more than 2 wt. % and lower than 20 wt. %, based on the total weight of the rubber formulation.

In an embodiment of a rubber formulation the activation component is silane.

In an embodiment of a rubber formulation the amount of silane in the present the rubber formulation is more than 1 wt. % and less than 10 wt. %, based on the total weight of the rubber formulation.

In another embodiment of a rubber formulation the activation component is a combination of silane and NR latex.

In such an embodiment of a rubber formulation the amount of silane in the present rubber formulation is more than 1 wt. % and less than 10 wt. %, preferably 5-9 wt. and the amount of NR latex in the present the rubber formulation, after drying, is in a range of 4-8 wt. %, based on the total weight of the rubber formulation.

As discussed above, the present invention relates to a method of preparing a rubber formulation as discussed above, the method comprising:
  subjecting the at least one natural or synthetic rubber, the micronized rubber composition and optionally one or more of processing aids, and the at least one activation component to shear at temperatures less than 100° C. such that surface activation of the at least one natural or synthetic rubber is achieved.

In an embodiment of the present invention the method further comprises extruding the surface activated rubber formulation into a slab.

For some applications the extruded solid material can be directly vulcanized into moulded applications.

A method for manufacturing micronized powders comprises several process steps, such as pre-grinding processing, cryogenic freezing, grinding of infeed material, resultant warming, ferrous metal and fiber removal, accumulation, screening, and storage of micronized powders. During the cryogenic grinding process a dusting agent is used to prevent the powder particles sticking to themselves. An example of such a dusting agent is talc. The present inventors found that by using an amount of 0.1-4.0 wt. %, preferably an amount of 0.3-1.5 wt. %, of fluffy synthetic precipitated amorphous silica (for example Hisil 255C-D), based on the total weight of the micronized powders, instead of talc, that the sieve yield of the grinding fraction 0-187 microns increased from around 8% to around 40%. It was also observed that a higher amount of tyre fibres (mixture of polyamide, polyester and rayon) could be removed from the MRP as the silica apparently reduced the forces of attraction between the rubber and the fibre. The present inventors assume that there might be some interaction between the silica and the silane. Such interaction may contribute to the attractive effects observed when using silane as the activation chemical.

For the purpose of promoting an understanding of the principles of the present invention, reference will now be made to the embodiments illustrated in the tables. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the invention relates.

The term "functionalized" or "activated" generally refers to functionalized or devulcanized material made from micronized rubber powders, as described herein above. The terms "functionalized" and "activated" are terms within the context having the same meaning. Such meaning is the ability to create crosslinks during vulcanization.

The term "subjected to shear" generally refers to a process of feeding the rubber formulation into the nip between first and second counter-rotating rolls, wherein the first roll is rotating at a different speed than the second roll.

The practice of the present invention can be further understood by reference to the following examples, which are provided by way of illustration only are not intended to be limiting.

EXAMPLES

Several test examples (see Table 1 and 2) were prepared out to investigate the performance of the rubber composition.

The test examples were compared with a so-called test recipe. The composition of the test recipe (according to ASTM D3191, ASTM D3191 excludes MRP) is shown in Table 1.

TABLE 1

| Composition of test recipe | | | | |
|---|---|---|---|---|
| PPHR | MATERIAL | WEIGHT | UNIT | % |
| 100 | SBR 1500 | 29.82 | grams | 54.22 |
| 3 | Zinc oxide | 0.89 | grams | 1.63 |
| 1 | Stearic acid | 0.30 | grams | 0.54 |
| 50 | N550 carbon black | 14.91 | grams | 27.11 |
| 27.67 | MRP sample | 8.25 | grams | 15.00 |
| 1.75 | Sulphur | 0.52 | grams | 0.95 |
| 1 | TBBS | 0.30 | grams | 0.54 |
| 184.4 | Total: | 55.00 | grams | 100 |
|  | Batch weight: | 55 |  |  |

The reference MRP sample is Cryofine 80 (Kargro) mesh, i.e. a cryogenically ground Micronized Rubber Powder produced exclusively from pre-selected end of life whole truck tyres, compliant with ASTM D5603 Class 80 1*.

Samples #1-#43 were prepared by mixing the components mentioned in Table 1 together with specific components. The rubber composition thus obtained was tested for several parameters, such as Mooney viscosity, Rheology Scorch time, ts2, Rheology T90, Rheology Delta S, Tangent Delta, Tensile Strength, Payne Effect, M100M300, Ultimate Elongation, Tear Strength, and Abrasion Loss. The results of these tests are shown in Table 2. On basis of these performance parameters an average improvement rate was calculated (%). An average improvement rate >40% is identified as acceptable.

In Table 2 component Silane Si69 is Bis(triethoxysilylpropyl)tetrasulfide, Vestenamer 8012 is a trans-polyoctenamer, Alpha wax is polyethylene wax, Trigonox 29 and Luperox 231 are 1,1-Di(tert-butylperoxy)-3,3,5-trimethyl-cyclohexane.

From Table 2 one will see that sample #7 (6% Silane (Si69)) has an average improvement rate of 65.7%. For sample #43 an even higher average improvement rate is obtained, i.e. a value of 79.1%. A comparison between sample #7 and sample #42 shows that the combination of both silane and NR latex has resulted in a high average improvement rate.

TABLE 2

| Sample | Description | MRP Content | Mooney Viscosity | Rheology Scorch time, ts2 | Rheology T90 | Rheology Delta S | Tangent Delta |
|---|---|---|---|---|---|---|---|
| Ref | Reference compound ASTM D3191 (target values) | 0 | 85% | 120% | 120% | 117% | 90% |
| Ref | Reference compound ASTM D3191 (normalised values) untreated MRP | 15% | 100% | 100% | 100% | 100% | 100% |
| 1 | 0.13% Chemlok 8212 + 4.6% water as carrier | 15% | 99% | 101% | 102% | 104% | 100% |
| 2 | 0.12% Chemlok 8212 bonding agent | 15% | 99% | 102% | 103% | 104% | 98% |
| 3 | 0.36% Chemlok 8212 bonding agent | 15% | 97% | 102% | 103% | 105% | 99% |
| 4 | 0.6% Chemlok 8212 bonding agent | 15% | 96% | 101% | 103% | 106% | 97% |
| 5 | 2% Silane (Si69) | 15% | 96% | 100% | 104% | 107% | 96% |
| 6 | 4% Silane (Si69) | 15% | 95% | 98% | 100% | 110% | 97% |
| 7 | 6% Silane (Si69) | 15% | 85% | 112% | 115% | 112% | 94% |
| 8 | 2.4% NR latex (dry) | 15% | 94% | 103% | 106% | 100% | 99% |
| 9 | 2.4% NR latex plus low amount of curative blend | 15% | 94% | 101% | 103% | 107% | 97% |
| 10 | 7.9% NR latex (dry) | 15% | 88% | 106% | 106% | 98% | 99% |
| 11 | 8.2% NR latex (dry) plus high amount of curative blend | 15% | 90% | 99% | 104% | 115% | 89% |
| 12 | 8% NR latex (dry) plus 1% organic peroxide curative | 15% | 88% | 108% | 112% | 116% | 92% |
| 13 | 0.6% Megum W9500 bonding agent | 15% | 95% | 101% | 102% | 108% | 97% |
| 14 | 1% SBR latex R4224 (dry) | 15% | 96% | 105% | 108% | 103% | 98% |
| 15 | 3.1% SBR latex R4220 (dry) plus curative blend | 15% | 94% | 101% | 103% | 107% | 97% |
| 16 | 3% Vestenamer granules plus high amount curatives | 15% | 89% | 104% | 103% | 115% | 95% |
| 17 | 3% Vestenamer powder <500 μm plus high amount curatives | 15% | 93% | 104% | 102% | 116% | 97% |
| 19 | 3% Vestenamer powder <125 μm plus high amount curatives | 15% | 86% | 104% | 102% | 115% | 95% |
| 20 | High amount curatives (whithout Vestenamer) | 15% | 99% | 98% | 97% | 100% | 98% |
| 21 | 3% % Vestenamer cryogenic powder <400 μm pre-mix plus low amount curatives | 15% | 84% | 106% | 109% | 106% | 94% |
| 22 | 3% % Vestenamer cryogenic powder <400 μm pre-mix plus high amount curatives | 15% | 83% | 104% | 103% | 115% | 95% |
| 23 | 1% organic peroxide Trigonox 29 | 15% | 95% | 101% | 102% | 104% | 100% |
| 24 | 2.3% NR latex (dry) plus 0.6% peroxide Trigonox 29 | 15% | 94% | 101% | 103% | 115% | 97% |
| 25 | 10% Alpha wax SX70 plus 1% predispersed sulphur (active content) | 15% | 73% | 100% | 114% | 106% | 99% |
| 26 | 10% Alpha Carisma 62 SX70 wax plus 1% predispersed sulphur (active content) | 15% | 71% | 99% | 112% | 104% | 101% |
| 27 | 10% Alpha Carisma Glossy wax plus 1% predispersed sulphur (active content) | 15% | 73% | 102% | 111% | 104% | 103% |
| 28 | 10% Alpha SX 5928 wax plus 1% predispersed sulphur (active content) | 15% | 69% | 98% | 108% | 106% | 101% |
| 29 | 2.5% NR latex premix with colloidal sulphur colloidal ZnO | 15% | 94% | 99% | 104% | 112% | 95% |
| 30 | 1.6% colloidal sulphur (active content) | 15% | 96% | 98% | 95% | 111% | 97% |
| 31 | 1.8% peroxide Luperox 231M90E (active content) | 15% | 98% | 100% | 100% | 107% | 96% |

TABLE 2-continued

| | | | | | | | |
|---|---|---|---|---|---|---|---|
| 32 | 1% Luperox 231M50 E (active content) | 15% | 98% | 101% | 101% | 104% | 98% |
| 33 | 1% Trinseo SBR latex K1 | 15% | 91% | 105% | 107% | 103% | 98% |
| 34 | 1% Trinseo SBR latex K2 | 15% | 99% | 97% | 97% | 96% | 103% |
| 35 | 1% Trinseo SBR latex K3 | 15% | 96% | 102% | 105% | 100% | 101% |
| 36 | 1% Trinseo SBR latex K4 | 15% | 94% | 105% | 107% | 103% | 98% |
| 37 | 1% Trinseo SBR latex K5 | 15% | 98% | 99% | 97% | 105% | 98% |
| 38 | 2.8% Silane (Si69) + 2.8% BDGA + 0.6% SBR latex (dry) + 8.3% Alpha Carisma Glossy | 15% | 82% | 112% | 116% | 112% | 93% |
| 39 | 9% Silane (Si69) | 15% | 96% | 97% | 99% | 117% | 90% |
| 40 | 4.5% Silane (Si69) + 4.5% BDGA | 15% | 84% | 96% | 108% | 110% | 98% |
| 41 | 0.6% Silane (Si69) + 2% NR latex (dry) | 15% | 90% | 101% | 102% | 108% | 97% |
| 42 | 0.6% Trigonox 29-C50 (active content) + 2% NR latex (dry) | 15% | 92% | 100% | 103% | 115% | 97% |
| 43 | 5.9% Silane (Si69) plus 6% NR latex (dry) | 15% | 84% | 122% | 116% | 112% | 94% |

| Sample | Tensile Strength | Payne Effect | M100 | M300 | Ulitmate Elongation | Tear Strength | Abrasion Loss | Improvement Rating, Ave, % | Extrude to solid |
|---|---|---|---|---|---|---|---|---|---|
| Ref | 125% | 70% | 117% | 121% | 110% | 131% | 62% | 100.0 | N/A |
| Ref | 100% | 100% | 100% | 100% | 100% | 100% | 100% | 0.0 | no |
| 1 | 102% | 98% | 101% | 101% | 99% | 102% | 95% | 7.9 | no |
| 2 | 104% | 94% | 103% | 106% | 101% | 101% | 94% | 15.4 | no |
| 3 | 107% | 92% | 104% | 108% | 101% | 106% | 92% | 22.0 | no |
| 4 | 106% | 90% | 105% | 107% | 100% | 109% | 91% | 24.8 | no |
| 5 | 105% | 87% | 106% | 107% | 103% | 108% | 92% | 27.2 | no |
| 6 | 104% | 84% | 105% | 108% | 98% | 115% | 89% | 28.7 | no |
| 7 | 111% | 74% | 109% | 111% | 110% | 121% | 81% | 65.7 | no |
| 8 | 102% | 99% | 99% | 98% | 105% | 103% | 98% | 10.2 | yes |
| 9 | 105% | 83% | 104% | 106% | 103% | 108% | 94% | 27.2 | yes |
| 10 | 101% | 99% | 102% | 103% | 107% | 120% | 82% | 29.5 | yes |
| 11 | 117% | 75% | 109% | 110% | 101% | 121% | 72% | 59.1 | yes |
| 12 | 115% | 76% | 112% | 110% | 88% | 125% | 74% | 61.4 | yes |
| 13 | 106% | 90% | 105% | 107% | 102% | 109% | 89% | 27.2 | no |
| 14 | 105% | 95% | 104% | 104% | 105% | 104% | 100% | 19.3 | no |
| 15 | 105% | 84% | 104% | 105% | 105% | 108% | 94% | 27.2 | no |
| 16 | 102% | 75% | 115% | 114% | 95% | 117% | 69% | 53.9 | yes |
| 17 | 96% | 79% | 113% | 112% | 93% | 114% | 72% | 42.9 | yes |
| 19 | 99% | 75% | 115% | 113% | 95% | 117% | 71% | 52.4 | yes |
| 20 | 97% | 106% | 105% | 104% | 92% | 103% | 98% | −2.0 | no |
| 21 | 105% | 80% | 106% | 108% | 101% | 103% | 93% | 36.6 | yes |
| 22 | 102% | 95% | 115% | 114% | 102% | 118% | 69% | 51.6 | yes |
| 23 | 102% | 98% | 101% | 101% | 100% | 102% | 95% | 9.8 | no |
| 24 | 107% | 83% | 104% | 106% | 103% | 112% | 70% | 42.1 | yes |
| 25 | 103% | 91% | 106% | 107% | 110% | 107% | 87% | 40.6 | no |
| 26 | 101% | 96% | 103% | 104% | 115% | 102% | 90% | 32.3 | no |
| 27 | 98% | 101% | 99% | 101% | 111% | 95% | 106% | 15.0 | no |
| 28 | 101% | 96% | 106% | 108% | 107% | 109% | 100% | 30.3 | no |
| 29 | 111% | 78% | 110% | 112% | 101% | 118% | 71% | 50.8 | yes |
| 30 | 113% | 89% | 109% | 111% | 102% | 108% | 60% | 41.3 | no |
| 31 | 104% | 87% | 111% | 110% | 97% | 117% | 69% | 37.8 | no |
| 32 | 100% | 93% | 105% | 106% | 106% | 123% | 74% | 32.7 | no |
| 33 | 104% | 95% | 104% | 103% | 105% | 107% | 98% | 22.0 | no |
| 34 | 94% | 106% | 95% | 97% | 92% | 103% | 105% | −16.5 | no |
| 35 | 98% | 102% | 100% | 99% | 98% | 103% | 104% | 0.8 | no |
| 36 | 103% | 95% | 104% | 103% | 111% | 107% | 93% | 24.8 | no |
| 37 | 94% | 106% | 95% | 97% | 92% | 103% | 71% | 3.5 | no |
| 38 | 112% | 75% | 115% | 117% | 90% | 110% | 65% | 66.5 | no |
| 39 | 106% | 69% | 118% | 125% | 94% | 115% | 60% | 61.4 | no |
| 40 | 109% | 86% | 104% | 107% | 112% | 108% | 89% | 38.2 | no |
| 41 | 106% | 90% | 105% | 107% | 102% | 109% | 81% | 32.3 | yes |
| 42 | 107% | 83% | 104% | 106% | 107% | 112% | 75% | 42.1 | yes |
| 43 | 120% | 74% | 109% | 111% | 110% | 121% | 68% | 79.1 | yes |

TABLE 3

| PPHR | MATERIAL | WEIGHT | UNIT | % |
|---|---|---|---|---|
| 100 | Natural Rubber TSR-10 | 29.04 | grams | 52.8 |
| 5 | Zinc oxide | 1.45 | grams | 2.6 |
| 3 | Stearic acid | 0.87 | grams | 1.6 |
| 50 | N375 carbon black | 14.51 | grams | 26.4 |
| 28.4 | MRP sample | 8.24 | grams | 15.0 |
| 2.5 | Sulphur | 0.72 | grams | 1.3 |
| 0.6 | TBBS | 0.17 | grams | 0.3 |
| 189.5 | Total: | 55.00 | grams | 100 |
|  | Batch weight: | 55.00 |  |  |

Several additional test examples (see Table 3 and 4) were prepared out to investigate the performance of the rubber composition.

The test examples were compared with a so-called test recipe. The composition of the test recipe (according to ASTM D3191, ASTM D3191 excludes MRP) is shown in Table 3.

The reference MRP sample is Cryofine 80 (Kargro) mesh, i.e. a cryogenically ground Micronized Rubber Powder produced exclusively from pre-selected end of life whole truck tyres, compliant with ASTM D5603 Class 80 1*.

Samples #1-#11 (see Table 4) were prepared by mixing the components mentioned in Table 3 together with specific components. The rubber composition thus obtained was tested for several parameters, such as Mooney viscosity, Rheology Scorch time, ts2, Rheology T90, Rheology Delta 5, Tangent Delta, Tensile Strength, Payne Effect, M100, M300, Ultimate Elongation, Tear Strength, and Abrasion Loss.

The results of these tests are shown in Table 4. On basis of these performance parameters an average improvement rate was calculated (%).

TABLE 4

| Sample | Description | MRP Content | Mooney Viscosity | Rheology Scorch time, ts2 | Rheology T90 | Rheology Delta S | Tangent Delta | Tensile Strength |
|---|---|---|---|---|---|---|---|---|
| Ref | Reference Compound ASTM D3191 (target values) | 0 | 85% | 120% | 120% | 117% | 90% | 125% |
| Ref MRP | Reference Compound ASTM D3191 (normalized values) untreated MRP | 15% | 100% | 100% | 100% | 100% | 100% | 100% |
| 1 | 0.5% Ultrasil VN3 + 2% Si69 | 15% | 92% | 100% | 104% | 103% | 98% | 106% |
| 2 | 0.5% Ultrasil VN3 + 3% Si69 | 15% | 91% | 108% | 111% | 104% | 95% | 117% |
| 3 | 0.5% Ultrasil VN3 + 4% Si69 | 15% | 91% | 110% | 112% | 111% | 95% | 116% |
| 4 | 0.5% Ultrasil VN3 + 5% Si69 | 16% | 89% | 112% | 115% | 110% | 94% | 118% |
| 5 | 0.5% Ultrasil VN3 + 6% Si69 | 15% | 86% | 112% | 115% | 116% | 92% | 111% |
| 6 | 0.5% Ultrasil VN3 + 1% Coupsil 8113 + 2% Si69 | 15% | 92% | 107% | 106% | 105% | 93% | 106% |
| 7 | 0.5% Ultrasil VN3 + 1% Coupsil 8113 + 3% Si69 | 15% | 90% | 109% | 110% | 105% | 94% | 117% |
| 8 | 0.5% Ultrasil VN2 + 1% Coupsil 8113 + 4% Si69 | 15% | 90% | 111% | 114% | 111% | 94% | 117% |
| 9 | 0.5% Ultrasil VN3 + 1% Coupsil 8113 + 5% Si69 | 15% | 89% | 112% | 116% | 112% | 94% | 120% |
| 10 | 0.5% Ultrasil VN3 + 1% Coupsil 8113 + 6% Si69 | 15% | 88% | 114% | 116% | 112% | 94% | 120% |
| 11 | 1% Coupsil 8113 + 5% Si69 | 15% | 87% | 113% | 116% | 114% | 92% | 121% |

| Sample | Payne Effect | M100 | M300 | Ultimate Elongation | Tear Strength | Abrasion Loss | Improvement Rating Ave, %* |
|---|---|---|---|---|---|---|---|
| Ref | 70% | 117% | 121% | 130% | 131% | 62% | 100.0 |
| Ref MRP | 100% | 100% | 100% | 100% | 100% | 100% | 0.0 |
| 1 | 88% | 106% | 103% | 108% | 100% | 97% | 19.7 |
| 2 | 79% | 111% | 107% | 110% | 108% | 90% | 44.2 |
| 3 | 76% | 110% | 108% | 114% | 120% | 88% | 55.1 |
| 4 | 74% | 111% | 108% | 119% | 118% | 82% | 62.8 |
| 5 | 74% | 113% | 118% | 110% | 116% | 81% | 65.0 |
| 6 | 83% | 106% | 107% | 122% | 104% | 95% | 36.5 |
| 7 | 76% | 109% | 113% | 126% | 108% | 89% | 54.0 |
| 8 | 75% | 113% | 118% | 124% | 109% | 81% | 64.6 |
| 9 | 74% | 113% | 120% | 123% | 117% | 80% | 71.5 |
| 10 | 74% | 115% | 122% | 112% | 117% | 75% | 71.9 |
| 11 | 74% | 114% | 120% | 120% | 126% | 75% | 78.8 |

*Improvment rating = average retention of reference compound properties containing no MRP compared with the reference compound containing untreated MRP In Table 4 Ultrasil VN3 is $SiO_2$, synthetically produced amorphous silicon dioxide (Evonik), Coupsil 8113 is precipitated silica, surface-modified with organosilane Si 69 (Evonik) and Silane (Si69) is a polyfunctional (polysulphide) silane (Evonik).

From Table 4 one will see that samples #1-5 (containing 0.5% Ultrasil VN3 and between 2-6% Silane (Si69)) show an improvement rating of between 19.7% and 65%. Samples #6-10 (containing 0.5% Ultrasil VN3, 1% of Coupsil 8113 and between 2-6% Silane (Si69)) show an improvement rating of between 36.5% and 71.9%. Sample #11 (containing 1% Coupsil 8113 and 5% Silane (Si69)) shows the best improvement rating of 78.8%.

The present inventors found that Ultrasil VN3 is a very effective dusting agent for deagglomerating the rubber particles after the cryogenic grinding process. Deagglomeration needs to take place in order to effectively sieve the fraction having the desired particle size distribution (D95<180 microns) and to screen out oversize particles for further processing. Clearly, when powder particles are stuck together they cannot be classified according to their size. The process of deagglomeration is also important to maximize the surface area of the powder to ensure that the activation chemicals have the possibility to coat the maximum amount of the powder's surface area. Ultrasil VN3—being highly receptive to hydrophobation and condensation reaction with silane Si69—also plays a role in the activation step.

The present inventors found that Coupsil 8113 has a similar effectiveness as Ultrasil VN3 as a dusting/deagglomeration agent. However, Coupsil 8113 plays a more significant role than Ultrasil VN3 as an activation chemical because it is coated with about 11% of Si69. Therefore, for example, Coupsil 8113 can fully replace Ultrasil VN3 as a dusting agent, meaning that VN3 would not need to be used at all.

The present inventors found that a combination of Coupsil 8113 (with a concentration of 1 wt. %) and Si69 at 4 wt. % concentration provides good results. Si69 also works well at 6 wt. % concentration without using any Coupsil 8113 but with using the dusting agent (0.25-0.5 wt. % of Ultrasil VN3) but such option is less costs attractive than adding 1 wt. % Coupsil 8113+4 wt. % Si69.

The invention claimed is:

1. A method for manufacturing micronized rubber powders comprising
grinding a rubber granulated feedstock to obtain micronized rubber powders, classifying the micronized rubber powders by size, and storing the micronized rubber powders
wherein during the grinding process an agent is used to prevent particles of the micronized rubber powders from sticking to themselves,
wherein the agent is chosen from the group of synthetic amorphous precipitated silica and silane-treated synthetic amorphous precipitated silica, or a combination thereof wherein the grinding process of the rubber granulated feedstock comprises a two-step grinding process including ambient grinding followed by cryogenic grinding, and wherein the particle size of the rubber granulated feedstock after the ambient grinding is 0.1-0.8 mm.

2. The method according to claim 1, wherein the total amount of the agent is in a range of 0.1-4.0 wt. % based on the total weight of the micronized rubber powders.

3. The method according to claim 1, wherein the agent is in a fluffy state and the BET surface area of the agent is between 50 and 250 $m^2/g$.

4. The method according to claim 1, wherein the agent is silane-treated synthetic amorphous precipitated silica.

5. The method according to claim 1, wherein the cryogenic grinding
is carried out in a range of −40 to −80° C. for a rubber granulated feedstock comprising natural rubber and in a range of −20 to −60° C. for a rubber granulated feedstock comprising natural rubber and styrene-butadiene rubber.

6. The method according to claim 5, wherein the particle size of the rubber granulated feedstock before the grinding process is 2-5 mm.

7. The method according to claim 1, wherein the rubber granulated feedstock is chosen from the group of natural rubber, synthetic polyisoprene rubber, high cis-1,4-polybutadiene rubber, medium vinyl polybutadiene rubber, high vinyl polybutadiene rubber, emulsion styrene-butadiene rubber, solution styrene-butadiene rubber, styrene-isoprene-butadiene rubber, styrene-isoprene rubber, butyl rubber, chlorobutyl rubber, bromobutyl rubber, polynorbornene rubber, ethylene-propylene rubber (EPR), ethylene-propylene-diene rubber (EPDM), nitrile rubber, carboxylated nitrile rubber, polychloroprene rubber (neoprene rubber), polysulfide rubbers, polyacrylic rubbers, silicone rubbers, chlorosulfonated polyethylene rubbers, and various mixtures thereof.

8. The method according to claim 1, wherein said size classification provides at least two micronized rubber powders product streams, comprising an 80 mesh stream and a 40 mesh stream.

9. The method according to claim 8, wherein at least one of the 80 mesh micronized rubber powders product stream and the 40 mesh micronized rubber powders product stream is contacted with an agent chosen from the group of synthetic amorphous precipitated silica, silane-treated synthetic amorphous precipitated silica, organosilane and organic peroxide, or a combination thereof for obtaining an activated micronized rubber powder product.

10. A rubber formulation comprising at least one natural or synthetic rubber, a micronized rubber powder obtained according to claim 1 and optionally one or more of processing aids, antidegradants, fillers, accelerators and curatives, wherein said rubber formulation comprises at least one activation component chosen from the group silane, NR latex, organic peroxides, polyoctenamer, curatives, polyethylene wax, emulsion styrene butadiene rubber (eSBR), liquid acrylonitrile butadiene rubber (NBR), zinc oxide and colloidal sulphur.

11. The rubber formulation according to claim 10, wherein the amount of the activation component(s) is in a range of 2-20 wt. %, based on the total weight of the rubber formulation.

12. The rubber formulation according to claim 10, wherein the activation component is silane.

13. The rubber formulation according to claim 12, wherein the amount of silane is in a range of 1-10 wt. % based on the total weight of the rubber formulation.

14. The rubber formulation according to claim 10, wherein the activation component is a combination of silane and NR latex.

15. The rubber formulation according to claim 14, wherein the amount of silane is in a range of 5-9 wt. and the amount of NR latex is in a range of 4-8 wt. %, based on the total weight of the rubber formulation.

\* \* \* \* \*